(12) United States Patent
McFarland et al.

(10) Patent No.: US 6,698,387 B1
(45) Date of Patent: Mar. 2, 2004

(54) METHOD OF HYDRATING THE INTAKE AIR OF AN INTERNAL COMBUSTION ENGINE

(76) Inventors: Steve McFarland, 4101 W. Green Oaks Blvd., #305-252, Arlington, TX (US) 76016; Wilbur A. Jones, 6735 Fire Hill Dr., Fort Worth, TX (US) 76137

(*) Notice: Subject to any disclaimer, the term of this patent is extended or adjusted under 35 U.S.C. 154(b) by 0 days.

(21) Appl. No.: 10/241,168

(22) Filed: Sep. 11, 2002

(51) Int. Cl.[7] ............................................ F02B 47/00
(52) U.S. Cl. .................................. 123/25 A; 123/255
(58) Field of Search ........................... 123/25 R, 25 A, 123/25 J, 25 K, 25 M, 25 N, 25 Q

(56) References Cited

U.S. PATENT DOCUMENTS

| | | | |
|---|---|---|---|
| 3,866,579 A | 2/1975 | Serruys | 123/25 A |
| 3,911,871 A | * 10/1975 | Williams et al. | 123/25 K |
| 3,915,669 A | 10/1975 | Minoza | 48/180 C |
| 4,476,817 A | 10/1984 | Lindberg | 123/3 |
| 4,808,287 A | 2/1989 | Hark | 204/182.5 |
| 4,960,080 A | 10/1990 | O'Neill et al. | 123/254 |
| 5,464,532 A | 11/1995 | Nowlin et al. | 210/190 |
| 5,522,349 A | 6/1996 | Yoshihara et al. | 123/25 C |
| 5,671,701 A | * 9/1997 | O'Donnell | 123/25 A |
| 6,170,470 B1 | 1/2001 | Clarkson et al. | 123/497 |
| 6,289,853 B1 | 9/2001 | Walczak et al. | 123/25 R |
| 6,357,671 B1 | 3/2002 | Cewers | 239/102.2 |
| 6,415,745 B1 | 7/2002 | Hellen et al. | 123/25 R |

FOREIGN PATENT DOCUMENTS

JP          11-141404      *  5/1999

* cited by examiner

Primary Examiner—Noah P. Kamen

(57) ABSTRACT

A method of hydrating the intake air of an internal combustion engine with cool purified water, deriving benefits of preventing the formation of excessive oxides of nitrogen and carbon, effecting a more complete combustion of hydrocarbon fuels, reducing the latent heat of combustion and increasing the power of combustion. The invention utilizes one or more ultrasonic devices to supply an aqueous vapor with droplets of less than 10 microns in size, varying in quantity according to engine size and load, having electronic sensors and controls for precision switching, metering and delivery. Thus equipped, an engine can be run as a lean burn, low emissions prime mover.

5 Claims, 4 Drawing Sheets

METHOD OF HYDRATING THE INTAKE AIR OF AN INTERNAL COMBUSTION ENGINE

FIELD OF THE INVENTION

The present invention relates to internal combustion engines in general and specifically internal combustion engines equipped with water injection. In particular the invention relates to an internal combustion engine having water injected into the intake air stream to improve overall engine efficiency and to reduce NOx, particulate matter and other toxic emissions by cooling combustion gases and by displacing a portion of hydrocarbon fuels.

BACKGROUND OF THE INVENTION

Water and other aqueous solutions have been injected into hydrocarbon-fueled engines by various ways and means to provide improved operation of said engines, emphasizing a variety of benefits. A water/fuel ratio of as low as one to twenty and as high as one to five is exemplified in related art. In the majority of embodiments water is used to cool and condense the air in the intake air stream. During the compression stroke, water droplets absorb heat produced from prior combustion, preventing pre-detonation and auto-detonation. During the power stroke water subsequently expands to super-heated steam by the burning fuel mixture, increasing the mechanical efficiency of the combustion process. Benefits may also include scavenging and preventing deposits in the combustion chamber of said engines, resulting in improved engine performance and decreased abrasion on internal engine surfaces. Water injected engines are generally reported to run more smoothly with less misfiring. Because adding humidity lowers combustion temperature by enthalpy, water injected engines can be adjusted to run on a leaner air/fuel mixture, thus conserving natural resources. Most significantly, reduction in peak combustion temperature minimizes the formation of oxides of nitrogen and carbon and reduces thermal stress on engine components. U.S. Pat. No. 3,866,579 to Serruys sets forth a method to spray variable amounts of water and increase airflow to the intake of an engine to achieve lower NOx emissions. His method lacks adequate control means and is capable of leaving excessive amounts of water in an intake path after engine shutdown. U.S. Pat. No. 3,915,669 to Minoza suggests a vaporizer carburetor which uses exhaust beat to vaporize water and gasoline and release them into the intake air of a vehicle engine for smooth, responsive acceleration and to reduce the heat of combustion. His device would require new engineering for almost every different engine. U.S. Pat. No. 4,476,817 to Lindberg reports that inducing steam through an ultrasonic device into the air stream of a gasoline-fueled vehicle engine reduced NOx emissions significantly, boosted the engine's power and smoothness of operation and prevented pre-detonation normally associated with the use of lower octane fuel than factory recommendations. He also reported adjusting the engine to run on a leaner air/fuel ratio. His device would also require special engineering for application on different engines. U.S. Pat. No. 4,960,080 to O'Neill et al. describes a system for the reduction of NOx emissions for a turbo-diesel generator set by means of a steady flow spray nozzle water injector that is switched on at a pre-determined electrical load and switched off as the load demand falls below that sane pre-determined value. His device is very limited in scope and effectiveness under varying conditions. U.S. Pat. No. 5,522,349 to Yoshihara et al. sets forth a water injection system that meters a spray of water into each cylinder of a diesel engine, timed synchronously with fuel injectors to achieve a spray pattern that he purports to be optimal in the abatement of NOx emissions. Their design calls for an entire combustion chamber design change to accommodate both the fuel injection and water injection systems. U.S. Pat. No. 6,170,470 to Clarkson et al. illustrates a water injection system for disposing of water condensate in a gasoline fuel tank by a series of sensors and valves that monitor and maintain an intermittent water injection system. Their system offers no continuity of benefits, but rather is a method for water disposal in rare instances. U.S. Pat. No. 6,414,745 to Hellen et al. describes a pulsating water injection system for a four-stroke diesel engine, synchronous with the intake stroke of each cylinder. They postulate that this is the most efficacious application of water injection for a diesel engine. Their system calls for an entire combustion chamber design change. U.S. Pat. No. 6,289,853 to Walczak et al. sets forth a water injection system for a marine engine, acquiring water for his system from a fresh or salt-water source in which a marine vessel moves. Their primary concern is setting forth a purification process to supply their water injection application. U.S. Pat. No. 4,808,287 to Hark and U.S. Pat. No. 5,464,532 to Nowlin et al. demonstrate effective means of providing a de-mineralized, ultra-pure water supply by passing it through ion exchange media and reverse osmosis systems. Those experienced in the art will recognize the advisability of employing such means. U.S. Pat. No. 6,357,671 to Cewers sets forth a means of ultrasonic vaporization of liquids. Though other references not cited have set forth numerous ways to vaporize liquids ultrasonically, this one is given as an example of a method that could be used to create an aqueous vapor for a water injection system such as the one described in the present embodiment.

As evidenced by these examples, various types of devices have been developed to induce water or other aqueous solutions into the intake air of internal combustion engines. These methods are not only limited in their inability to precisely detect and provide means for optimal engine operation but also are incapable of metering of a continuously optimized volumetric ratio of water in the final fuel/air charge. Spray or steam injection systems also could damage the turbine blades in a turbocharged engine unless injected downstream from the compressor. Injecting hot steam also has a disadvantage in that it doesn't have as much expansion capability in the power stroke as cool vapor has. In the event that one of the prior art systems did not completely cut of the water supply before engine shutdown, an accumulation of water in the intake manifold or combustion chamber could result in damage to internal engine parts on subsequent start-up or over a protracted period of time. Although this problem is generally recognized as critical to the effective operation of a water injection system none of the prior art adequely demonstrates fail-safe measures to assure a minimal level of humidity in an intake manifold at engine shutdown. Most of the prior art expresses a concern about using unpurified water in a water injection system. However, almost all of them offer no means for the removal of minerals from the water, which produce scale and corrosion. The only one that does incorporate a means of water demineralization is Walczak, et al. and their only reason for doing so is to be able to use seawater in their marine application. Analysis of water in most parts of the world reveals a mineral content that presents a concern for use in an engine. Direct injection of water into the combustion chamber presents similar challenges to other methods, but complicates broad application of its technique by requiring highly specialized controls and injectors, precision machining and an individualized system for every engine style. Related art systems have not been entirely successful in satisfying engine requirements, largely due to their inability to respond adequately to a wide range of engine operating conditions. None of the prior art addresses the monitoring of exhaust gas temperature as a means for continuous precision control of NOx reduction by water injection. Since combustion temperature is the major contributor to the production of oxides of nitrogen, it is essential to introduce an improved method for exhaust temperature measurement and control in order to achieve a more precise NOx control. None of the prior art addresses water vapor injection for emissions control at engine idle speed, which accounts for large volumes of NOx emissions, particularly in urban population areas. None of the prior art addresses water vapor injection for engine coolant temperature control at engine idle speed, which is a major problem in heavy stop and go traffic. It is evident that, for the reasons stated, none of the prior art has provided a water injection system with adequate means to achieve significant technical or commercial acceptance.

BRIEF SUMMARY OF THE INVENTION

It is a general objective of this invention to provide a novel method and system for controlling exhaust gas temperature by controlling the humidity level in the intake air stream of an internal combustion engine, which will reduce harmful emissions, improve performance, increase fuel efficiency and promote longevity of said engine.

More specifically, it is an object of the present invention to provide a novel and unique hydration system and method by which a cool liquid, namely water or other aqueous solution, can be ultrasonically vaporized and introduced at a measured rate into an engine intake air stream, being activated, de-activated and variably controlled, primarily, in conjunction with the exhaust gas temperature of said engine and, secondarily, in conjunction with the power output levels and operating parameters of said engine, ranging from idle speed to fill load conditions. A programmable logic controller or an embedded controller can be programmed to interpret electrical output signals and to automatically control said hydration system to respond with precision to continuously optilize engine performance.

An important object of the present invention is to set forth a novel and unique hydration system that assures the absence of minerals, especially calcium, other dissolved solids and impurities in the water supply, which could be harmful to said hydration system and to said engine. The implementation of current water purification and demineralization technologies can more than adequately perform this task.

A vitally important object of the present invention is to devise a means of assuring the complete evacuation of excess humidity from the intake air stream of an engine before allowing a complete shutdown of said engine. Under normal operating conditions a water injection system such as described in the current preferred embodiment would already be automatically disengaged by the time said engine was shut off by the operator. In circumstances where there was not sufficient time for said water injection system to evacuate excess humidity from said intake air stream before engine shutdown, the installation of an interrupt delay in the ignition system of said engine will provide the extra seconds required to accomplish this objective.

A further object of the present invention is to provide a novel and unique hydration system for the intake air stream of an engine, which is readily adaptable to a variety of engine types and sizes for both stationary and mobile applications.

The present invention achieves these and other objects by providing a system for regulating the emissions discharge of an engine, whether equipped with a turbocharger compressor or by natural aspiration, whether equipped with a fuel injection system or a carbureted fuel-mixing device, being a prime mover for a variety of working applications. Automatic switching activates said hydration system when said engine is under a load and deactivates said system when said engine is in a no-load status. In a matter of seconds after engine start-up exhaust gas temperature can rise to a level that represents a significant production of NOx, hydrocarbons and particulate matter, which need to be controlled. A thermal probe located in the exhaust path of said engine signals an electronic control unit that said engine exhaust has achieved a pre-determined thermal value that corresponds to a specified emissions level. The output of said electronic controller then activates an ultrasonic vaporization unit to achieve an initial level of humidity in the intake air stream. Said ultrasonic unit generates an aqueous vapor (<10 micron droplets) from an ultra-pure de-mineralized water supply. In the present embodiment said aqueous vapor is introduced into the intake air downstream from an air-filtering device and a turbocharger when a pre-designated exhaust gas temperature is achieved, then passes into an intake manifold. In other embodiments said aqueous vapor could be introduced anywhere along an intake air pathway, including being injected directly into the combustion chamber of an engine. As engine exhaust temperature rises, due to increased load or higher ambient temperature, said control unit increases the quantity of said aqueous vapor to counteract increasing emissions and to maintain smooth operation of said engine. The resulting system is both reliable and cost-effective, and is readily adaptable to a variety of engine types and sizes by increasing or decreasing the aqueous vapor necessary to accommodate the range of exhaust temperature differential imposed by the output load of an engine.

Each of these illustrations demonstrates a possible configuration of the various components of the current invention, not being limited to the configurations herein presented, but these are set forth as a sampling of the numerous applications wherein the invention would benefit the operation of a wide variety of internal combustion engine configurations and applications.

DETAILED DESCRIPTION OF THE INVENTION

Figure 1:
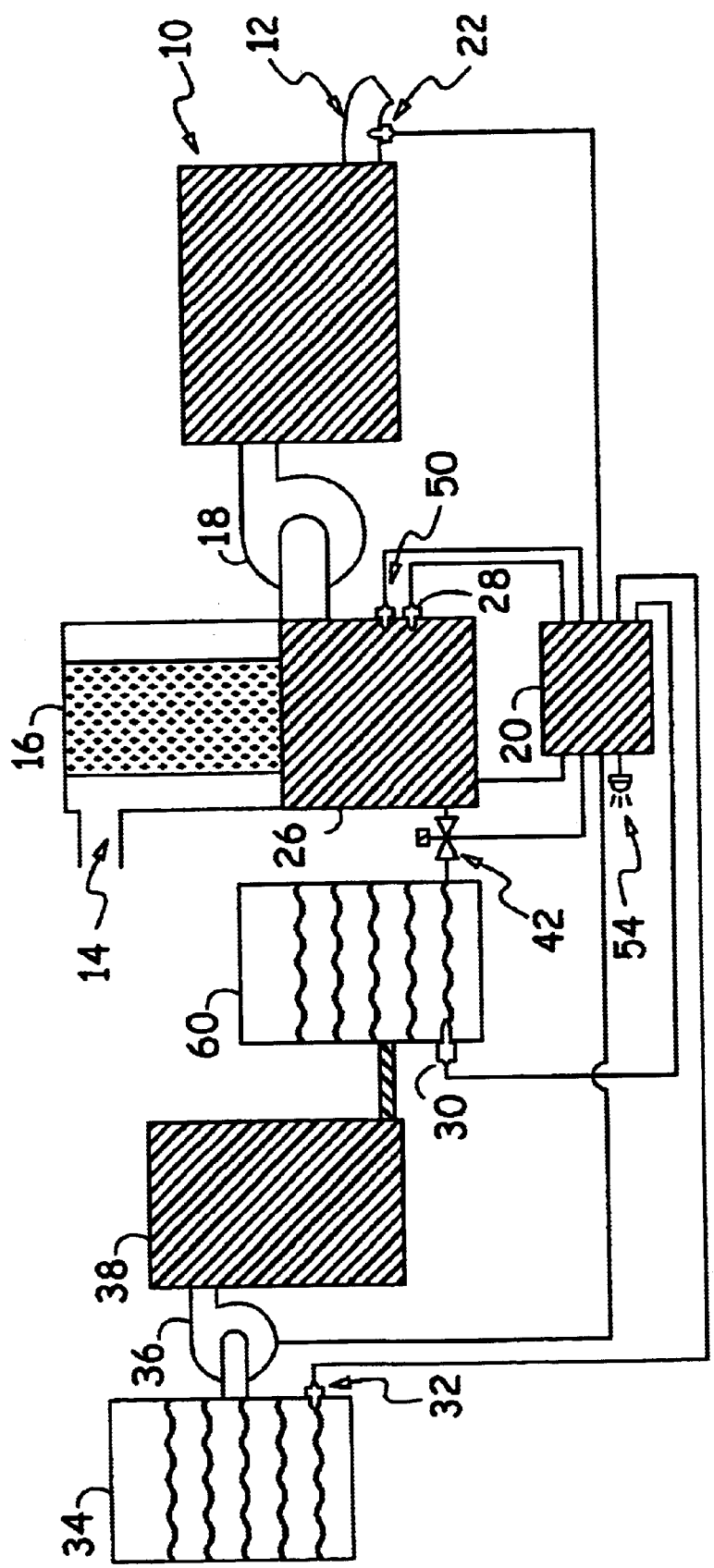
FIG. 1 illustrates a system that produces an ultra-pure water supply and then ultrasonically converts said water from a liquid state to a cool aqueous vapor, introducing it into the air intake stream of an internal combustion engine upstream from a turbocharger, having said system activated, de-activated and controlled by monitoring the exhaust gas temperature of said engine.

The FIG. 1 drawing depicts a piston engine 10, equipped with an air intake housing 14, containing an air filtering device 16, connected to a turbocharger compressor 18, having an exhaust system 12 for the dispersion of combustion gases expelled by said engine 10. A water supply reservoir 34 contains water of unspecified purity and quantity. A liquid level indicator 32 monitors the volume of water in said water supply reservoir 34. A pressurizing means 36 transfers water through an ultra-purity demineralization system 39 and deposits it into a variably pressurized holding tank 60. Pressure monitoring devices 28 and 30 signal said pressurizing means 36 to engage or disengage for maintaining a specified pressure range in said holding tank 60. A thermal sensor 22 signals a valve 42 to open and transfer water to an ultrasonic vaporization unit 26. After an initial pressurization cycle, as described above, said ultrasonic vaporization unit 26 is ready to operate and will be ready to operate on subsequent engine start-ups. Said thermal sensor 22 monitors exhaust gas temperature. When said exhaust gas temperature attains a specified level, an electronic control module 20 initializes said ultrasonic vaporization unit 26, producing an aqueous vapor that is injected into said intake air stream of said engine 10. Combustion gases are expelled through said exhaust system 12 and as exhaust gas temperature increases, said thermal sensor 22 signals said ultrasonic vaporization unit 26 to produce more aqueous vapor. Any desired volume of aqueous vapor may be produced in conjunction with exhaust temperature rise. As said thermal sensor 22 indicates a decrease in exhaust gas temperature, the volume of aqueous vapor is concurrently decreased until exhaust gas temperature is low enough to signal an interrupt of said ultrasonic vaporization unit 26, which actuates a drip-free valve 50 and relieves pressure from said holding tank 60. One or more annunciators 54 indicate functionality of system parameters.

Figure 2:
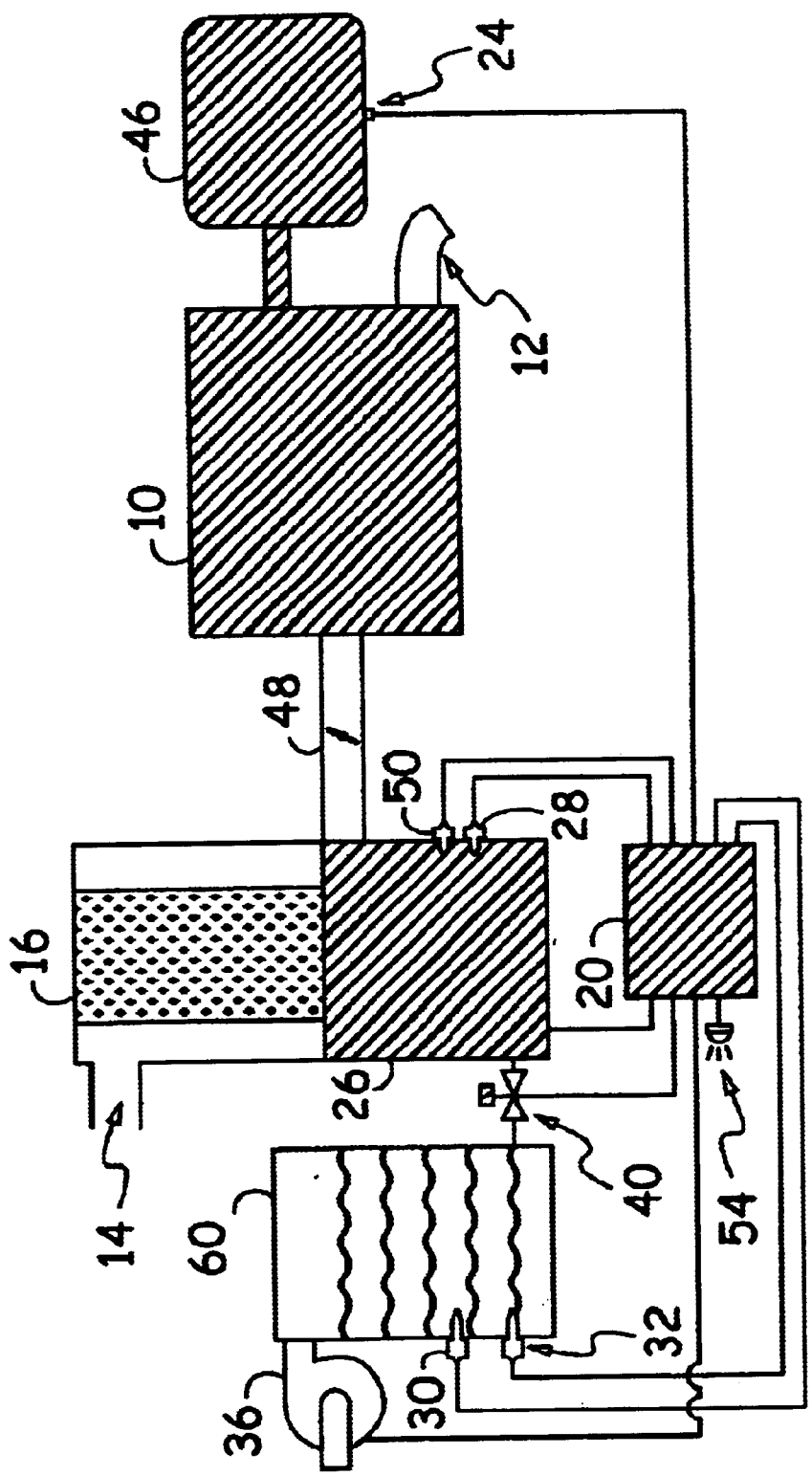
FIG. 2 shows a system having an ultra-pure water supply and then ultrasonically converts said water from a liquid state to a cool aqueous vapor, introducing it into the air intake stream of a naturaly-aspirated internal combustion engine, having said system activated, de-activated and controlled by monitoring the load on the power windings of an electric power generator.

The FIG. 2 drawing depicts a piston engine 10, equipped with an air intake housing 14, containing an air filtering device 16, connected to a naturally-aspirated air/fuel mixing apparatus 48, having an exhaust system 12 for the dispersion of combustion gases expelled by said engine 10. An electric power generator 46 is coupled to said engine. A pressurizing means 36 transfers water into an ultra-pure water holding tank 60. Pressure monitoring devices 28 and 30 signal said pressurizing means 36 to engage or disengage to maintain a specified pressure range in said holding tank 60. A liquid level indicator 32 monitors the volume of water in said holding tank 60. A pressure monitoring device 28 signals a variable pressure valve 40 to open and fill an ultrasonic vaporization unit 26. After an initial pressurization cycle, as described above, said ultrasonic vaporization unit 26 is ready to operate and will be ready to operate on subsequent engine start-ups. A load sensor 24 monitors the level of current demand on said generator 46. An electronic control module 20 opens a drip-free valve 50 and initializes said ultrasonic vaporization unit 26, producing an aqueous vapor that is discharged into said naturally-aspirated air/fuel mixing apparatus 48, into the intake air stream of said engine 10. Combustion gases are then expelled through said exhaust system 12 and as electrical load increases, said load sensor 24 signals said ultrasonic vaporization unit 26 to produce more aqueous vapor. Any desired volume of aqueous vapor may be produced in conjunction with an increase in electrical load. As said load sensor 24 indicates a decrease in electrical load, the volume of aqueous vapor is concurrently decreased until load is low enough to signal an interrupt of said ultrasonic vaporization unit 26, which actuates said drip-free valve 50 and relieves pressure from said holding tank 60. One or more annunciators 54 indicate functionality of system parameters.

Figure 3:
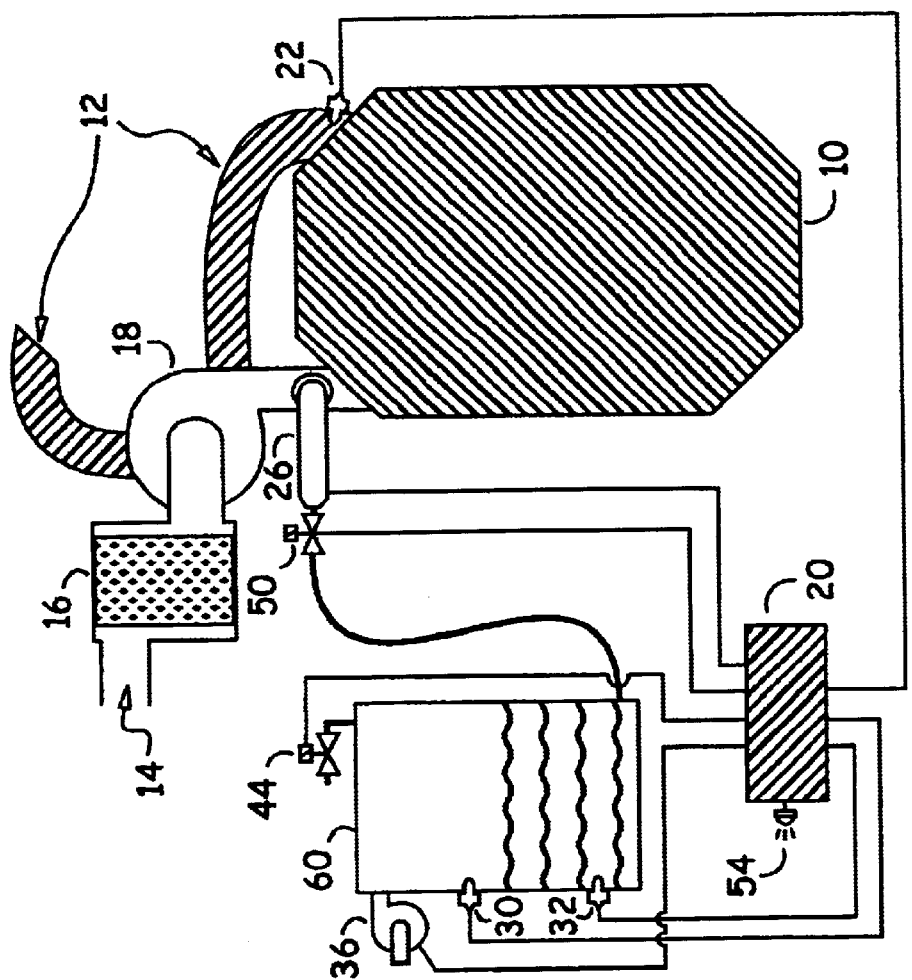
FIG. 3 depicts a system having a water purification system and then ultrasonically converts said ultra-pure water from a liquid state to a cool aqueous vapor, introducing it into the air intake stream of an internal combustion engine downstream from a turbocharger, having said system activated, de-activated and controlled by monitoring engine exhaust gas temperature.

The FIG. 3 drawing depicts a piston engine 10, equipped with an air intake housing 14, containing an air filtering device 16, connected to a turbocharger compressor 18, having an exhaust system 12 for the dispersion of combustion gases expelled by said engine 10. A pressurized water holding tank 60, containing an ultra-pure water supply, is variably pressurized by a pressurizing means 36, which is activated and de-activated by said electronic control module 20 to achieve a desired increase of pressure in said holding tank 60. When said engine 10 is running, a thermal sensor 22 monitors exhaust gas temperature and upon achieving a pre-determined exhaust gas temperature an electrical signal is sent to said electronic control module 20 to close a valve 44, which will seal said holding tank 60 and simultaneously engage a pressurizing means 36 and open a drip-free valve 50 and release water into an ultrasonic vaporization unit 26 connected to the intake air stream of said engine 10. In the preferred embodiment the electrical output signal from said thermal sensor 22 is the principal controlling criteria to engage, disengage and variably adjust the volume of aqueous vapor being injected into the intake air stream of said engine 10, electrically connected to said electronic control module 20 which is programmed to respond to said electrical output signal from said thermal sensor 22 by controlling said pressurizing means 36 to increase, decrease or shut off the flow of water vapor. When said thermal sensor 22 registers a pre-determined low exhaust temperature, an electrical signal from said electronic control module 20 shuts off said ultrasonic vaporization unit 26, actuating said drip-free valve 50 and opening said valve 44 to relieve pressure from said holding tank 60. Should engine operator attempt engine shutdown before said thermal sensor 22 has attained said pre-determined low exhaust temperature, said electronic control module 20 will initiate a time-delay protocol to keep engine running for a pre-determined time period, allowing adequate time to evacuate excess humidity from said engine 10 before complete engine shutdown. Certain pre-determined commands are programmed into said electronic control module 20, which sends electrical output signals to at least one annunciator 54 to alert engine operator of system operating parameters. Annunciators 54 may be in the form of an indicator light, an audio output, a communications signal, a digital display or a combination of annunciator devices.

Figure 4:
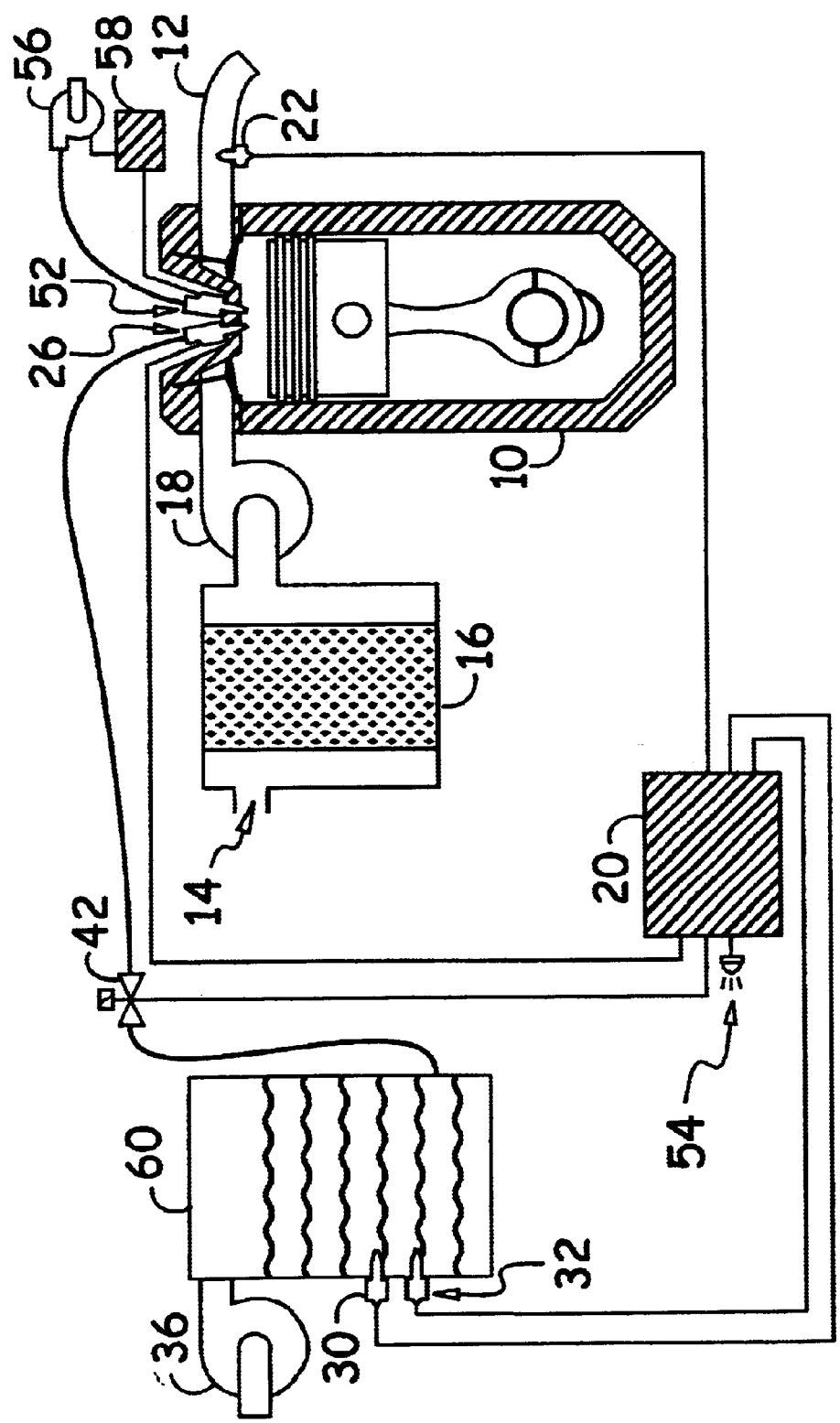
FIG. 4 shows a system having an ultra-pure water supply and then ultrasonically converts said water from a liquid state to a cool aqueous vapor, introducing it directly into the combustion chamber of an internal combustion engine, having said system activated, de-activated and controlled by monitoring the load on said engine as determined by exhaust temperature.

The FIG. 4 drawing depicts a piston engine 10, equipped with an air intake housing 14, containing an air filtering device 16, connected to a turbocharger compressor 18, having a fuel injection system 56 with at least one fuel injector 52 operated by an electronic control unit 58 and an exhaust system 12 for the dispersion of combustion gases expelled by said engine 10. A pressurizing means 36 transfers ultra-pure water into a pressurized water holding tank 60. A pressure monitoring device 30 signals said pressurizing means 36 to engage or disengage to maintain a specified pressure range in said holding tank 60. A liquid level indicator 32 monitors the volume of water in said holding tank 60. After an initial pressurization cycle, as described above, an ultrasonic vaporization unit 26 is ready to operate and will be ready to operate on subsequent engine start-ups. A thermal sensor 22 signals an electronic control module 20 to open a valve 42 and send water to said ultrasonic vaporization unit 26. Combustion gases are expelled through said exhaust system 12 and as the power demand rises, said thermal sensor 22 signals said electronic control module 20 to initialize said ultrasonic vaporization unit 26 to produce an aqueous vapor. Any desired volume of aqueous vapor may be produced in conjunction with an increase or decrease of engine load. As said thermal sensor 22 indicates a decrease in power demand on the engine, the volume of aqueous vapor is concurrently decreased until the power demand is low enough to signal an interrupt of said ultrasonic vaporization unit 26, which actuates and closes said valve 42 and shuts off water from said holding tank 60. One or more annunciators 54 indicate functionality of system parameters.

What is claimed is:

1. A water injection engine comprising:

a) an internal combustion engine having at least one combustion chamber, having at least one reciprocating piston, having a cylinder head, having at least one intake port and having at least one exhaust port with at least one exhaust conduit;

b) an air intake path, having an air filtering system and an air mixing system, directing a charge of air into said air intake port;

c) an exhaust path, having said exhaust port connected to said exhaust conduit for the expulsion of exhaust gases from said engine;

d) a water purification system for the removal of minerals and other impurities for the purpose of providing an ultra-pure water supply in fluid connection with an incoming water supply of unspecified purity being forced into a holding tank by a pressurizing means;

e) a holding tank for containing said ultra-pure water supply in fluid connection with said water purification system, including a solenoid valve for the purpose of open/closed control of said holding tank, a liquid level sensor for the purpose of maintaining a pre-determined quantity of said ultra-pure water supply and a variable pressurizing means for the purpose of variable pressure control of said ultra-pure water supply;

f) at least one ultrasonic vaporization unit in fluid connection with said holding tank to create an aqueous vapor having droplets of less than 10 microns diameter;

g) a housing containing said ultrasonic vaporization unit connected to said air intake port for mixing said vapor with said intake air charge of said internal combustion engine;

h) at least one electronic control unit for the purpose of monitoring and controlling functions of said water injection engine which pertain to the operation of said ultrasonic vaporization unit including at least the monitoring of exhaust gas temperature, liquid level control of said ultra-pure water supply, pressure control of said holding tank, and control of said ultrasonic vaporization unit including on/off control;

i) at least one thermal sensor, having its temperature sensing element exposed to the inside of said exhaust conduit located near said exhaust port of said engine and electrically connected to said electronic control unit.

2. A water injection engine according to claim 1 being capable of operating within a pre-determined range of exhaust gas temperatures of said internal combustion engine wherein:

a) minimal injection of said aqueous vapor is initialized when said thermal sensor registers a pre-determined exhaust gas temperature and signals said electronic control unit that said temperature has been achieved, closing said solenoid valve on said holding tank and opening said variable pressurizing means to pressurize said holding tank to a pre-determined level and opening a drip-free shut-off in fluid connection with said ultrasonic vaporization unit;

b) variable control of said aqueous vapor is synchronous to an increase or decrease of exhaust gas temperature from said engine signaled by said thermal sensor in electrical connection with said electronic control unit and said variable pressurizing means to increase or decrease volumetric flow of said ultra-pure water to said ultrasonic vaporization unit for delivery of said aqueous vapor to said engine;

c) shut off of said aqueous vapor is normally achieved when said thermal sensor registers a pre-programmed low temperature of said exhaust gases, which then sends a signal to said electronic control unit to signal said solenoid valve to open and release all pressure from said holding tank and to close said drip-free shut-off of said ultrasonic vaporization unit.

3. A water injection engine according to claim 1 wherein said electronic control unit is designed to detect operating anomalies, to shut off aqueous vapor and to activate at least one annunciator signal electrically connected to said electronic control unit in the event of a system malfunction, including at least one of the following conditions:

a) detection of impurities in said ultra-pure water supply, b) detection of low liquid level in said ultra-pure water supply, c) detection of pressure loss in said ultra-pure water supply.

4. A water injection engine according to claim 1 wherein premature engine shutdown, before minimum exhaust temperature parameters have been achieved, is prevented by:

a) said electronic control unit receiving a signal that engine shutdown has been initiated, b) said electronic control unit activating a time delay interrupter that is electrically connected to the ignition circuit of said engine, c) said electronic control unit concurrently shutting off said ultrasonic vaporization unit, d) said time delay interrupter allowing sufficient time for excess humidity to adequately evacuate from said intake air path of said engine before complete engine shutdown.

5. A water injection engine according to claim 1 having said water purification system for removing minerals and other impurities from a water supply source and in fluid connection with said pressurizing means wherein supply water of unspecified purity is forced to pass through purification means, including at least filtration media, ion exchange media or reverse osmosis membrane for the removal of minerals and other particulate matter that might damage or inhibit the proper function of said ultrasonic vaporization unit or said engine.

* * * * *